Sept. 8, 1964  E. S. CAIN, JR., ETAL  3,147,951
FLUID PRESSURE OPERATED TURBINE
Filed May 29, 1961  4 Sheets-Sheet 1

INVENTORS
EARL S. CAIN JR.
ARMAND BOSCO
BY EMERSON L. KUMM
GENE L. GREEN

Herschel C. Omohundro
ATTORNEY

Sept. 8, 1964  E. S. CAIN, JR., ETAL  3,147,951
FLUID PRESSURE OPERATED TURBINE
Filed May 29, 1961  4 Sheets-Sheet 2

INVENTORS
EARL S. CAIN JR.
ARMAND BOSCO
BY EMERSON L. KUMM
GENE L. GREEN

Herschel C. Omohundro
ATTORNEY

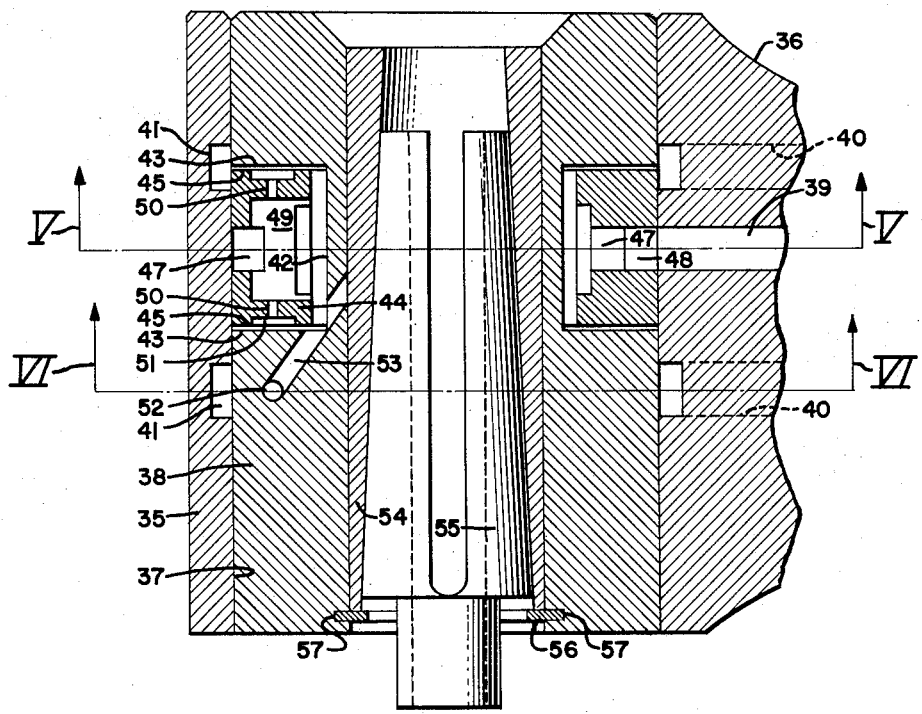
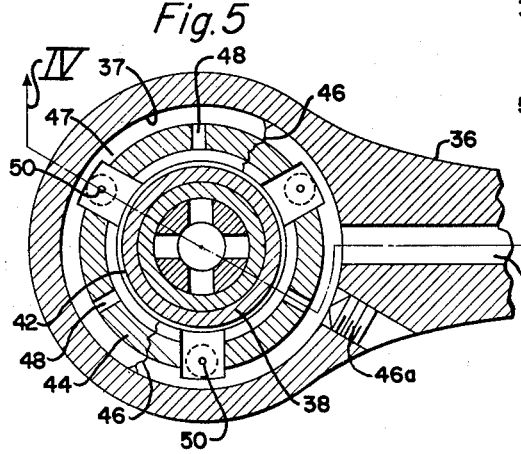
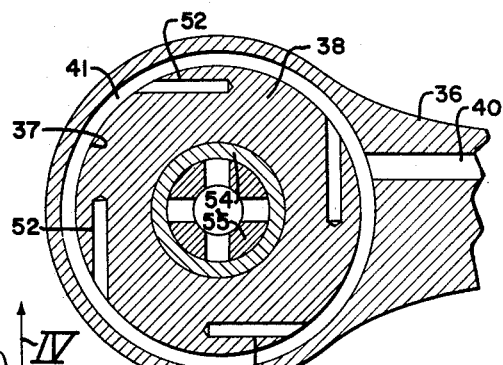
INVENTORS
EARL S. CAIN JR.
ARMAND BOSCO
EMERSON L. KUMM
GENE L. GREEN
BY
ATTORNEY

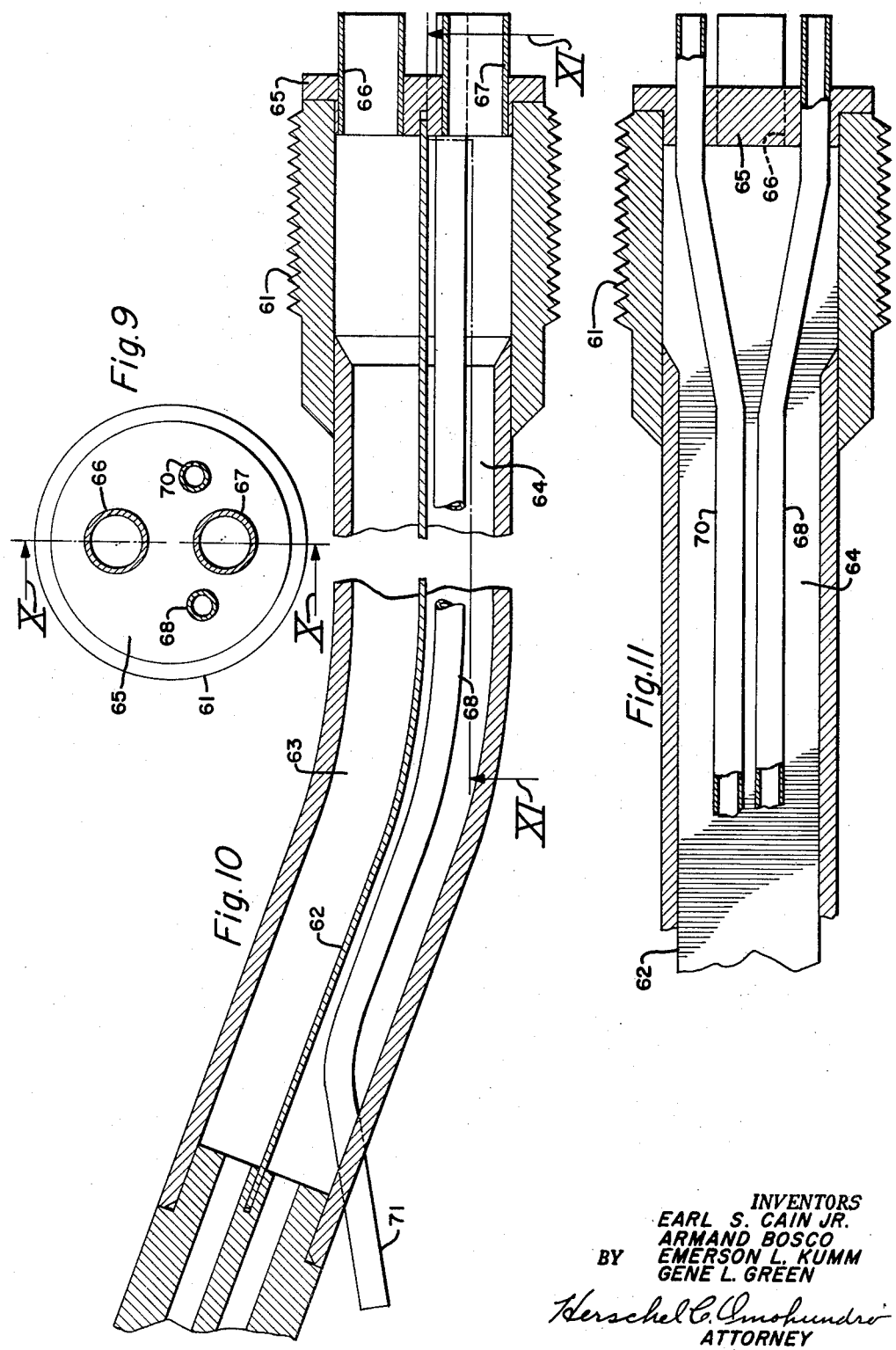

United States Patent Office 3,147,951
Patented Sept. 8, 1964

3,147,951
FLUID PRESSURE OPERATED TURBINE
Earl S. Cain, Jr., Phoenix, Armand Bosco and Emerson L. Kumm, Scottsdale, and Gene L. Green, Glendale, Ariz., assignors to The Garrett Corporation, Los Angeles, Calif., a corporation of California
Filed May 29, 1961, Ser. No. 113,542
11 Claims. (Cl. 253—2)

This invention relates generally to power translating mechanism, and is more particularly directed to fluid pressure energy translating devices, such as fluid pressure operated motors or turbines. Still more particularly, the invention pertains to miniature turbines designed to operate at high speeds with a minimum consumption of fluid under pressure.

An object of this invention resides in providing a small compact turbine having relatively few parts, and in particular, being devoid of the customary antifriction bearings of the ball, roller, or needle type which require oily or greasy lubricants and wear or otherwise deteriorate rapidly.

Another object of this invention resides in providing a small turbine with a unitary element supported for rotation in a casing by a fluid film and having means for causing jets of fluid to issue from the element to effect its rotation, the same fluid that is used to drive the rotatable element being employed to support and lubricate it.

Still another object of the invention is to provide a small turbine having combined hydrostatic and hydrodynamic thrust bearings formed by opposed thrust bearing surfaces on the turbine rotor and casing and having means for introducing limited quantities of fluid, such as gases or liquids under pressure, to the spaces between the opposed bearing surfaces.

A further object of the invention is to provide a turbine having a casing and a rotor journalled therein, the rotor having jet nozzle means disposed to discharge fluid under pressure substantially tangentially from the rotor to effect high speed rotation, the rotor also being provided with a bore on the axis of rotation to receive a tool-holding chuck.

A further object of the invention is to provide a small gaseous fluid operated turbine for driving any desired instrumentality, the turbine having a housing forming a cylindrical chamber with an annular recess intermediate its length and opposed end thrust bearing surfaces, such chamber receiving a cylindrical rotor formed with an external groove intermediate its ends to receive gaseous fluid under pressure from a suitable source, the rotor being provided with internal passages communicating with the external groove to receive air under pressure and conduct it to a plurality of tangentially directed jet outlets registering with the annular recess in the housing, flow from the jet outlets causing a pinwheel turbine effect, the rotor and/or housing having minute openings communicating with the groove and permitting some of the gaseous fluid under pressure to be fed to spaces between the end thrust bearing surfaces and complemental surfaces on the rotor whereby the latter will be cushioned by a gaseous film.

A still further object of the invention is to provide a small turbine, i.e., one with a rotor approximately .250 of an inch or less in diameter and .500 of an inch or less in length, the rotor being supported, in the turbine casing, lubricated, and driven by a gaseous fluid under pressure, the turbine being designed to drive small operating instrumentalities such as dental burrs, grinding wheels, drills, shafts, and similar devices.

Another object of the invention is to provide a turbine which when used for dental work may be incorporated in the head end of a dental handpiece which is inserted and manipulated in the patient's mouth during tooth drilling, grinding, cleaning and polishing operations.

An object also is to provide the turbine mentioned in the preceding paragraph with a novel tool or other instrument-holding means which comprises forming a tapered opening on the axis of rotation of the turbine rotor and movably disposing a similarly tapered chuck member in the tapered opening, the chuck being split to provide jaw sections which serve to grip the tool or other instrument when the chuck is moved toward the smaller end of the hole and release it when moved in the opposite direction, the taper being so arranged that the pressure of the tool against the work will serve to cause the chuck to more firmly grip the tool and thus prevent slippage between the tool and the turbine rotor.

Other objects and advantages of the invention will become apparent to persons skilled in the art by reference to the following detailed description and accompanying drawings wherein:

FIG. 4 is an axial sectional view on a large scale taken through a modified form of turbine embodying the present invention;

FIGS. 5 and 6 are horizontal sectional views on a large scale taken through the modified form of turbine on the planes indicated by the lines V—V and VI—VI, respectively, of FIG. 4;

FIG. 9 is a similar view on the plane indicated by the line IX—IX of FIG. 7;

FIG. 10 is a longitudinal sectional view taken through the handpiece on the plane indicated by the line X—X of FIG. 9; and FIG. 11 is a horizontal sectional view taken on the plane indicated by the line XI—XI of FIG. 10.

Figure 1:
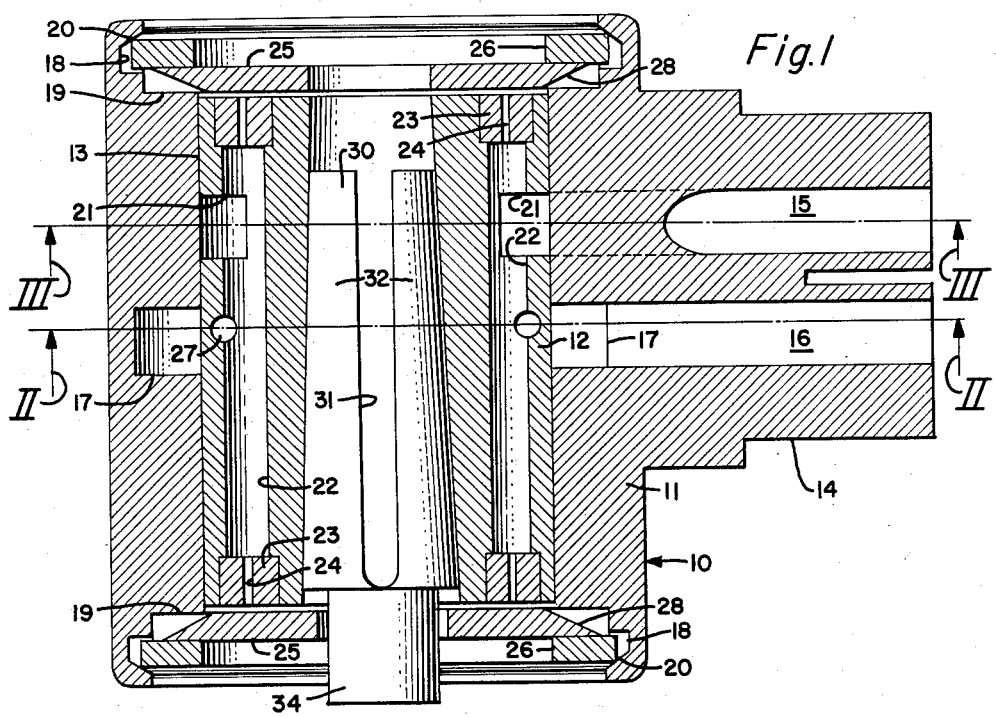
FIG. 1 is an axial sectional view on a large scale taken through one form of the turbine formed in accordance with the present invention.
Figure 2:
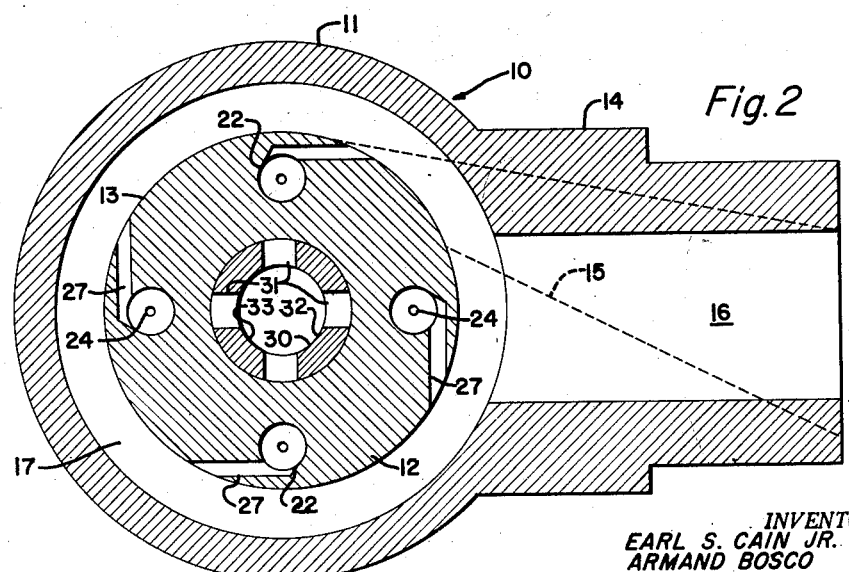
FIGS. 2 and 3 are horizontal sectional views, also on a large scale, taken through the turbine shown in FIG. 1 on the planes indicated by the lines II—II and III—III, respectively, of such figure.
Figure 3:
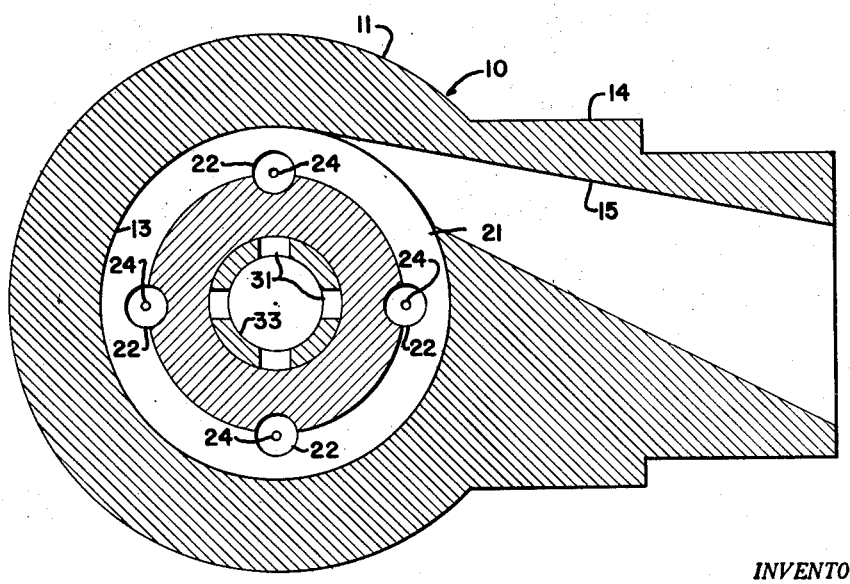

Referring more particularly to the drawings, FIGS. 1, 2 and 3 show a first form of turbine embodying the principles of the invention. The turbine is designated generally by the numeral 10 and includes a casing 11, and a rotor 12. The casing is a generally cylindrical body having a cylindrical bore 13 extending from one end to the other, the ends of the bore being open. The body has a projection 14 on one side by which the turbine may be secured to and supported by a suitable handle. The projection is also provided with inlet and outlet ports 15 and 16, the latter communicating with an annular recess 17 formed in the body intermediate the length of the bore. Inlet port 15, in the turbine illustrated, extends to the bore 13 and communicates therewith substantially tangentially to the outer periphery thereof. This construction is employed so that fluid flowing through the inlet port will tend to assist the rotary movement of the rotor. This particular flow also facilitates the entrance of the fluid into certain passages which will be referred to hereinafter.

The ends of the body are counterbored to provide shoulders 19, and outwardly of such shoulders the body is provided with grooves 18 having inclined shoulders 20. The bore 13 provides a rotor chamber in the body for the reception of the rotor 12, this element being of cylindrical form and closely fitting the bore for rotation therein. The bore wall forms a journal bearing for the rotor, the body and the rotor being formed of suitable wear-resisting material. In one form of the invention tungsten carbide was employed. Any other material with the desired quality of resisting wear and the capability of being precisely and smoothly finished may be employed.

Rotor 12 has an external groove 21 formed therein, this groove registering and communicating with the inlet port 15 when the rotor is properly positioned in the body. The rotor is also provided with a plurality (in the present instance, four) of circumferentially spaced, longitudinally extending passages 22, these passages being intersected by the groove 21.

In the form of the invention illustrated in FIGS. 1, 2 and 3, the ends of the passages 22 are counterbored for the reception of plugs 23, these plugs being formed of bearing metal or other suitable material. The plugs are provided with minute orifice 24 which communicate with the passages 22 and permit fluid to flow from such passages outwardly to the ends of the motor. To limit the endwise movement of the rotor, the ends of the body receive thrust bearing plates or rings 25, these members being held in engagement with the shoulders 19 by snap-rings 26 positioned in the grooves 18. The outer edges of the snap-rings engage the inclined surfaces 20, a tendency of the rings to expand causing the rings to urge the thrust rings 25 toward the shoulders 19. The length of the rotor is such as to provide a predetermined limited amount of clearance between the ends of the rotor and the thrust rings 25, fluid under pressure flowing through the orifices 24 to these clearance spaces serving to lubricate the rotor and provide thrust cushions.

As shown in FIG. 2, the rotor is also provided with a plurality of jet outlet nozzles 27, which extend into the rotor from the periphery thereof in registration with the recess 17, the inner ends of the jet outlet nozzles communicating with the passages 22. The jet outlet nozzles are so arranged in the rotor that when fluid under pressure issues therefrom, a pinwheel turbine effect will be secured, causing the rotor to revolve at a high rate of speed, for example, of the order of from 250,000 to 400,000 r.p.m.

As pointed out in the objects, the turbine is extremely small and, of course, the passages, orifices 24 and jet outlet nozzles will also be quite small, so that fluid under pressure supplied through the inlet port 15 will flow through the passages 22, some of the fluid being fed through the orifices to support and lubricate the rotor, the remaining fluid issuing from the nozzles 27 to effect rotary movement of the rotor. It will be obvious that due to the small size of the turbine and ports, only a limited amount of fluid will be used to effect the operation of the turbine. Some of the fluid will find its way into the space between the cylindrical walls of the rotor and chamber and effect a floating support for the rotor. The bearing rings 25 have notches 28 on their inner sides at the outer edges to permit some of the escaping fluid to flow to the exterior of the turbine body.

From FIG. 1, it will be observed that the rotor 12 has a tapered central opening formed therein. This opening is arranged on the axis of rotation of the rotor and is provided to receive a similarly tapered chuck 30. This chuck has its tapered portion provided with a plurality of slots 31 to form spring prongs 32. The chuck also has a central opening 33 extending therethrough for the reception of the shank of a small instrument such as a dental burr, or any other small tool. When such shaft is positioned in the opening 33 and the shaft and chuck are moved toward the small end of the tapered opening, the shaft will be firmly gripped so that it will rotate in unison with the rotor. The chuck has an end portion 34 extending from the tapered portion and projecting from one open end of the body. It will be noted that the thrust ring at this end of the body projects slightly beyond the periphery of the tapered opening so that the chuck will be retained in the rotor until the retaining ring 26 and thrust ring 25 are removed from this end of the body.

It will be obvious that when it is desired to remove the tool from the chuck, it will only be necessary to insert a small instrument into the opposite end of the body and move the tool element and chuck toward the larger end of the tapered bore. This movement will release the grip of the chuck on the tool to permit its withdrawal.

A second form of turbine embodying the principles of the invention has been illustrated in FIGS. 4–6, inclusive. This turbine is in many respects similar to the turbine first described, the differences residing mainly in the manner of retaining the turbine rotor in the body. In the modified form of turbine, the body 35 is also cylindrical in configuration with a projection 36 at one side. The body has a longitudinally extending, cylindrical bore 37 formed therein for the rotatable reception of the turbine rotor 38. In this form of the invention, the body has an inlet port 39 extending through the projection 36 to the bore 37. It also has one or more outlet ports 40 extending through the projection to a corresponding number of internal annular recesses 41 formed in the body. These recesses are spaced intermediate the length of the bore 37. As in the first form of the invention, the bore 37 forms a rotor chamber.

To retain the rotor in such chamber, the rotor is provided with an external groove 42 to provide a plurality of opposed thrust bearing surfaces 43. This groove receives a ring element 44 which provides complemental end thrust bearing surfaces 45 which are disposed in close proximity to the surfaces 43 when the ring is in place in the groove 42. To permit such ring to be installed, it is fractured, as at 46, to provide complemental halves which match one another and complete the ring when assembled, as shown in FIG. 5. The ring is retained in the body in any suitable manner, such as by a set screw 46a. The ring is formed with an external groove 47 which registers, when the ring is properly positioned in the body, with the inlet port 39. A plurality of ports 48 are formed in the ring to establish communication between the external groove and the interior of the ring. It is also provided internally with circumferentially spaced recesses 49 which also communicate with the groove 47 and the interior of the ring. Minute orifices 50 establish communication between the recesses 49 and the end thrust bearing surfaces 45. If desired, these surfaces may be formed with fluid pressure receiving pockets 51 around the orifices 50. As in the first form of the invention described, the orifices 50 feed fluid under pressure to the spaces between the thrust bearing surfaces to lubricate such surfaces and provide bearing cushions between the rotor and the thrust bearing members.

The rotor 38 is also provided with a plurality of jet nozzle outlets 52, these being formed by drilling openings into the rotor from the side wall thereof substantially tangential to the rotor periphery. The inner ends of these jet nozzle outlets communicate with angularly directed passages 53 which, in the present illustration, may be formed by drilling from one end of the rotor through a central bore. These angular passages communicate with the space at the interior of the ring 44 so that fluid under pressure supplied through the inlet port 39 will flow through the groove 47, ports 48, and recesses 49 to the inner ends of the passages 53. This fluid will issue from the jet outlet nozzles, imparting rotary movement to the rotor. Some of the fluid admitted to the recesses 49 will flow through the orifices 50, as previously pointed out.

As shown in FIG. 4, the rotor 38 is also provided with a longitudinally extending bore at its axial center. This bore receives a sleeve 54 which closes the inner ends of the passages 53 so that any fluid admitted thereto must flow outwardly through the nozzles 52. The exhaust from the jet nozzles escapes through the outlet port 40. The sleeve 54 has a tapered central opening for the reception of a chuck 55 which is identical with chuck 30 in the first form of the invention. The chuck 55 includes the same parts and functions in the same manner as the chuck 30. It is retained in place by a snap-ring 56 disposed in a groove 57 in the rotor 38 at the large end of the tapered bore.

It will be obvious from the foregoing that the turbines in FIGS. 1 and 4 are similar in construction and operation. Each has a housing with a cylindrical rotor chamber and a cylindrical rotor journalled in the rotor chamber, the rotor having a plurality of jet nozzle outlets to provide a pinwheel turbine effect, the rotor also having opposed end thrust bearing surfaces, and the body having complemental end thrust bearing surfaces arranged in close proximity to the surfaces on the rotor. One or more of the members is provided with reduced orifices through which fluid under pressure is fed to the spaces between the end thrust bearing surfaces. Both forms of the invention have inlets for fluid under pressure which serves to operate the turbine as well as to support and lubricate the turbine rotor. It has been pointed out previously that the turbines have been designed particularly for operation with gaseous fluid under pressure, although it should be understood that suitable liquids could be employed with equal facility.

Figure 7:
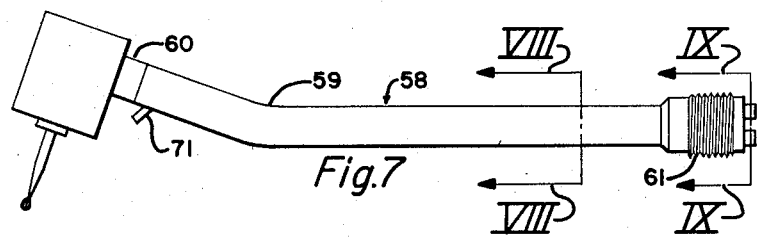
FIG. 7 is a side elevational view on a slightly enlarged scale of a dental handpiece selected for illustration of one device in which a turbine formed in accordance with the present invention may be incorporated.
Figure 8:
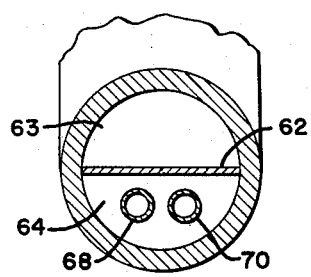
FIG. 8 is a vertical transverse sectional view taken through the handpiece shown in FIG. 7 on the plane indicated by the line VIII—VIII.

The turbines have been designed for use in small tools or other instrumentalities. One form of device to which the turbines are particularly applicable has been illustrated in FIG. 7. This device comprises a dental handpiece, designated generally by the numeral 58. This handpiece comprises a tube which is bent, as at 59, to facilitate its insertion and manipulation in a patient's mouth during tooth drilling, grinding or polishing operations. The turbine is secured to one end of the tube, as at 60, either form of turbine being applicable. The opposite end of the handpiece is provided with threads 61 to which a suitable nut may be applied to secure the handpiece to a flexible conduit leading from a console. Since the flexible conduit and console form no part of the present invention, they have not been illustrated. The handpiece, as shown in FIGS. 8 and 10, is provided with a longitudinally extending partition 62 which divides the tube into inlet and outlet passages 63 and 64. If the first form of turbine is employed, passage 63 communicates with port 15 while passage 64 connects with port 16. If the second form of the invention is used, the inlet passage 63 will communicate with port 39 while passage 64 will connect with port 40. The rear end of the handpiece, that is, the end opposite the turbine end, is closed by a plug 65 which has tubular connections 66 and 67 projecting therefrom. Connection 66 communicates with passage 63 while the other connection communicates with passage 64. These connections receive the ends of flexible conduits (not shown) for leading fluid under pressure from the console to the handpiece and exhaust fluid from the handpiece back to the console or other point of discharge.

As shown in FIGS. 9 and 11, small tubes 68 and 70 are also provided in the handpiece to conduct air, water or other fluids to external projections 71 adjacent the turbine, these projections being employed to direct jets of the fluids against the work being drilled.

As pointed out previously, the turbines are particularly applicable to the dental handpiece illustrated; however, it should be obvious that they may be employed for any work of a small character such as bone drilling, watch making, and other jewelry repairs.

While two forms of the invention have been illustrated, it should be obvious that many minor changes may be made in the construction and relation of parts without departing from the spirit and scope of the invention.

We claim:

1. A turbine comprising: a body member providing a cylindrical chamber with an inlet port, an annular exhaust recess intermediate the ends of said chamber, an outlet port leading from said recess, and open ends; a thrust bearing ring in each end of said chamber; a cylindrical rotor member disposed in said chamber, the diameter and length of said rotor member closely conforming to the diameter of said chamber and the distance between said thrust rings, respectively, so that said rotor member will be supported in said chamber on a thin film of fluid between the rotor member and the body member; a plurality of bores extending longitudinally of said rotor member; a plug in each end of each bore, the outer surfaces of said plugs being substantially flush with the adjacent end wall of said rotor member, each plug being provided with a minute orifice, said bores communicating with said inlet; and a plurality of jet outlet ports formed in said rotor member to provide a pinwheel turbine effect, said jet outlet ports communicating with said bores and discharging into said exhaust recess.

2. A turbine comprising: a body member providing a cylindrical chamber with an inlet port, a combined annular exhaust recess and outlet port, and open ends; a thrust bearing ring in each end of said chamber; a cylindrical rotor member disposed in said chamber, the diameter and length of said rotor member closely conforming to the diameter of said chamber and the distance between said thrust rings, respectively, so that said rotor member will be supported in said chamber on a thin film of fluid between said rotor member and the body member; turbine jet outlet ports formed in said rotor member for discharging fluid substantially tangentially therefrom into said exhaust recess; restricted orifices formed in the end walls of said rotor member for admitting fluid to the spaces between said rotor member and said bearing rings; and passageways formed in said rotor for establishing communication between said inlet, said jet outlet ports and said restricted orifices.

3. A turbine comprising: a body member providing a cylindrical chamber with an inlet port, a combined annular exhaust recess and outlet port, and open ends; a thrust bearing ring in each end of said chamber; a cylindrical rotor member disposed in said chamber, the diameter and length of said rotor member closely conforming to the diameter of said chamber and the distance between said thrust rings, respectively, so that said rotor member will be supported in said chamber on a thin film of fluid between said rotor member and said body member; a plurality of jet outlet ports formed in said rotor member to provide a pinwheel turbine effect, said jet outlet ports discharging into said exhaust recess; a plurality of minute orifices formed in the end walls of said rotor member for admitting fluid to the spaces between said rotor member and said bearing rings; and passageways formed in said rotor member for establishing communication between said inlet, said jet outlet ports, and said minute orifices.

4. A turbine comprising: a body member providing a cylindrical chamber with an inlet, an outlet, and open ends; a cylindrical rotor member supported for rotary movement in said chamber, said rotor member being journalled by said chamber wall and being provided with a plurality of axially extending passages communicating with said inlet and terminating in restricted outlet ports in the end walls of the rotor member, said rotor member also being formed with a plurality of jet ports communicating with said passages and disposed to discharge fluid substantially tangentially relative to the rotor member into said outlet; and thrust bearing plates secured in open ends of said body member to limit endwise movement of said rotor member.

5. A turbine comprising: a body member providing a cylindrical chamber with an inlet, an outlet, and open ends; a cylindrical rotor member supported for rotary movement in said chamber, said rotor member being journalled by said chamber wall and being provided with a plurality of axially extending passages communicating with said inlet and terminating in restricted outlet ports in the end walls of the rotor member, said rotor member also being formed with jet ports communicating at one end with one of said passages and discharging substantially tangentially from the rotor member into said outlet; thrust bearing plate means at the opposite ends of said chamber to limit endwise movement of said rotor member; a tapered hole extending axially through said rotor member; and a split correspondingly tapered chuck disposed in said tapered hole to receive and grip a shaft.

6. A turbine for driving a tool element comprising: a body member providing a cylindrical chamber with an inlet, a combination annular recess and outlet, and open ends; a cylindrical rotor member closely fitting said chamber and supported by said chamber wall for rotary movement, said rotor member having an external annular groove communicating with said inlet, a plurality of axially extending passages communicating with said annular groove and terminating in restricted outlet ports in the end walls of the rotor member, and a plurality of jet ports communicating with said passages and disposed to discharge fluid substantially tangentially into said annular recess; thrust bearing plates secured in the open ends of said body member to limit endwise movement of said rotor member; and tool element receiving chuck means axially disposed in said rotor member.

7. A turbine for driving a tool element comprising: a body member providing a cylindrical chamber with an inlet, a combination annular recess and outlet, and open ends; a cylindrical rotor member closely fitting said chamber and supported by the chamber wall for rotary movement, said rotor member having an external annular groove communicating with said inlet, a plurality of circumferentially spaced axially extending passages communicating with said annular groove and terminating in restricted outlet ports in the end walls of the rotor member, and a plurality of jet ports extending substantially tangentially from said passages through the outer wall of said rotor member to said annular recess; thrust bearing plates secured in the open ends of said body member to limit endwise movement of said rotor member; and tool element receiving chuck means axially disposed in said rotor member.

8. A turbine for driving a small tool element comprising: a body member providing a substantially cylindrical rotor chamber with an inlet and a combined annular recess and outlet; a cylindrical rotor member supported by the rotor chamber wall for rotary movement in said rotor chamber, said rotor member having an external annular groove intermediate the ends thereof to provide said rotor member with opposed end thrust bearing surfaces; a ring member disposed in the groove in said rotor member and secured against longitudinal movement in said body member, said ring member providing thrust bearing surfaces adjacent those on said rotor member, one of said members having minute orifices for feeding fluid under pressure to the spaces between said end thrust bearing surfaces; a plurality of jet nozzle outlets in said rotor member in registration with the recess in said body member for discharging fluid under pressure substantially tangentially from said rotor member to effect rotary movement thereof; and passage means provided in certain of said members to establish communication between said inlet, said minute orifices, and said jet nozzle outlets.

9. A turbine for driving a small tool element comprising: a body member providing a substantially cylindrical rotor chamber with an inlet, a combined annular recess and outlet, and at least one open end; a cylindrical rotor member supported by the rotor chamber wall for rotary movement in said rotor chamber, said rotor member having an external annular groove intermediate the ends thereof to provide said rotor member with opposed end thrust bearing surfaces; a ring member disposed in the groove in said rotor member and secured against longitudinal movement in said body member, said ring member providing thrust bearing surfaces adjacent those on said rotor member, one of said members having minute orifices for feeding fluid under pressure to the spaces between said end thrust bearing surfaces; a plurality of jet nozzle outlets in said rotor member in registration with the recess in said body member for discharging fluid under pressure substantially tangentially from said rotor member to effect rotary movement thereof; passage means provided in certain of said members to establish communication between said inlet, said minute orifices, and said jet nozzle outlets; and chuck means disposed on the axis of rotation of said rotor member for receiving and holding a small tool element with one end protruding from the open end of said body member.

10. A turbine comprising: body means providing a cylindrical chamber with an inlet and an outlet; cylindrical rotor means disposed in said chamber, said rotor means being supported by the cylindrical wall of said chamber for rotary movement and provided with oppositely facing end thrust surfaces, said rotor means also being formed with a plurality of jet ports disposed to discharge fluid substantially tangentially relative to said rotor means into said outlet to effect the rotation of said rotor means; and end thrust bearing means removably disposed in said body means to provide end thrust bearing surfaces adjacent those on said rotor means, certain of said means forming restricted outlet ports leading to the spaces between said adjoining thrust bearing surfaces; and passage means establishing communication between said inlet, said restricted outlet ports and said jet ports.

11. A turbine comprising: a body member forming a rotor chamber having a substantially smooth internal cylindrical wall, said body member having an inlet for fluid under pressure and an outlet for exhaust fluid; a rotor member of smooth cylindrical form closely fitting said rotor chamber and supported by the cylindrical wall of said rotor chamber for rotary movement relative to said body member, said rotor member having oppositely facing end thrust surfaces normal to the axis of rotation thereof; means supported in said body member to provide oppositely facing end thrust surfaces also normal to the axis of rotation of said rotor member and disposed closely adjacent those on said rotor member, one of said members providing one of said end thrust surfaces with restricted orifices movable relative to the other for directing fluid under pressure to the space between said thrust bearing surfaces; jet nozzle outlet means in said rotor for discharging fluid under pressure substantially tangentially from said rotor to impart rotary motion thereto; and passage means in said members for establishing communication between said inlet, said restricted orifices, and said jet nozzle outlet means.

References Cited in the file of this patent

UNITED STATES PATENTS

| | | |
|---|---|---|
| 717,875 | Lindmark | Jan. 6, 1903 |
| 807,452 | Franke | Dec. 19, 1905 |
| 1,270,808 | Franklin | July 2, 1918 |
| 1,906,715 | Penick | May 2, 1933 |
| 2,049,343 | Warren | July 28, 1936 |
| 2,128,157 | Monnier et al. | Aug. 23, 1938 |
| 2,458,128 | Alterio | Jan. 4, 1949 |
| 2,602,632 | Serduke et al. | July 8, 1952 |
| 2,891,312 | Ellis | June 23, 1959 |
| 2,897,596 | Maurer | Aug. 4, 1959 |
| 2,945,299 | Fritz | July 19, 1960 |

FOREIGN PATENTS

| | | |
|---|---|---|
| 250,207 | Great Britain | Feb. 3, 1927 |